Aug. 28, 1956  F. I. RATAICZAK  2,760,649
REFRIGERATING APPARATUS
Filed Nov. 16, 1953  2 Sheets-Sheet 1
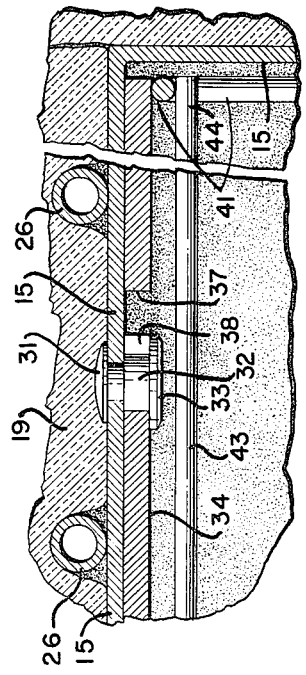
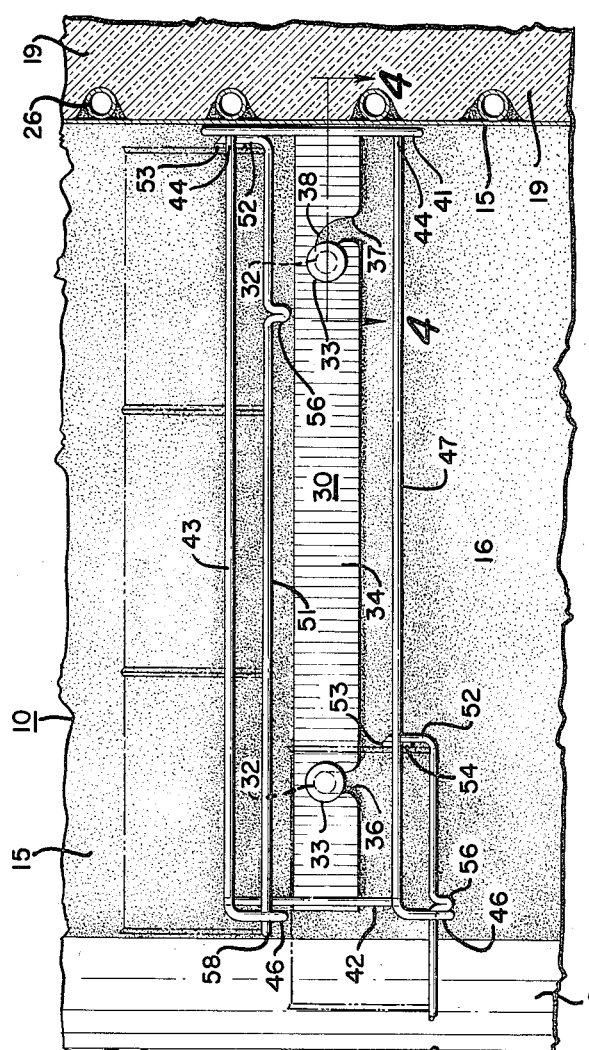
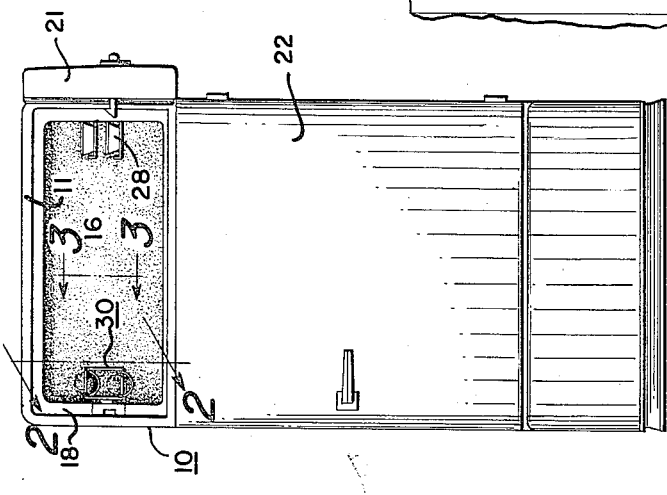
INVENTOR.
Francis I. Rataiczak.
BY
R. R. Cardon.
His Attorney.

INVENTOR.
Francis I. Rataiczak.
BY
R. R. Candor
His Attorney.

United States Patent Office 2,760,649
Patented Aug. 28, 1956

2,760,649

REFRIGERATING APPARATUS

Francis I. Rataiczak, Dayton, Ohio, assignor to General Motors Corporation, Detroit, Mich., a corporation of Delaware Application November 16, 1953, Serial No. 392,213

1 Claim. (Cl. 211—143)

This invention relates to the storage of canned frozen fruit juices and the like particularly in household refrigerator cabinets.

Frozen packaged foods are usually crowded into the freezing or frozen food storage compartment of a household refrigerator and cans containing frozen juices and other food products are then placed in the compartment at random in crevices or spaces adjacent and between the packaged frozen foods. Such storage of frozen food products renders it difficult to find a certain can of the desired frozen juice and frequently a housewife in addition to shifting packaged food around within the frozen food compartment is required to remove several packages of frozen food from the compartment before the desired can is found. I contemplate the segregation of cans of frozen juice or the like from other frozen foods in a frozen food storage compartment of a refrigerator cabinet and to render the cans readily accessible for removal therefrom so as to prevent shifting and handling of a plurality of packaged frozen foods and the hazard of dropping these packaged foods from the compartment when a can of juice or the like is to be removed therefrom.

An object of my invention is to provide a novel and improved arrangement for storing cans of frozen juice in an isolated manner within the freezing or frozen food storage compartment of a household refrigerator cabinet.

Another object of my invention is to provide an arrangement for storing a plurality of cans of frozen juices and the like in a compartment of a refrigerator cabinet in which the shifting, handling and hazard of dropping other food products from the compartment when a particular can is to be removed therefrom is eliminated.

A further object of my invention is to provide a frozen juice or the like can storage and dispensing device within the freezing or frozen food compartment of a refrigerator which device includes movable portions supporting the cans in segregated fashion relative to other frozen foods in the compartment and wherein the movable portions thereof are slidable outwardly of the front of the compartment to render the cans readily available for removal from the refrigerator.

A still further object of my invention is to provide a low cost means or device within a freezing or frozen food storage compartment of a domestic refrigerator cabinet which includes a wire rack or framework and preferably U-shaped wire slides therein which are movable and extensible outwardly relative to the rack at the front of the compartment.

In carrying out the foregoing object it is a more specific object of my invention to arrange the spaced apart legs of U-shaped wire slides in a horizontal position to form the sole support for the cans, to provide an interlock between the slides and the stationary rack so as to prevent detachment of the slides from the rack and to provide a stop means on the slides for limiting outward movement thereof relative to the rack.

Other objects and advantages of the present invention will become apparent from the specification and claim appended thereto and forming a part of this application.

The nature and characteristic features of the present invention will be more readily understood from the following description taken in conjunction with the accompanying drawings, also forming a part of this application in which:

Figure 1 is a front view of a refrigerator cabinet showing the door of the frozen food storage compartment thereof in open position to disclose a device of the present invention mounted in the compartment;

Figure 2:
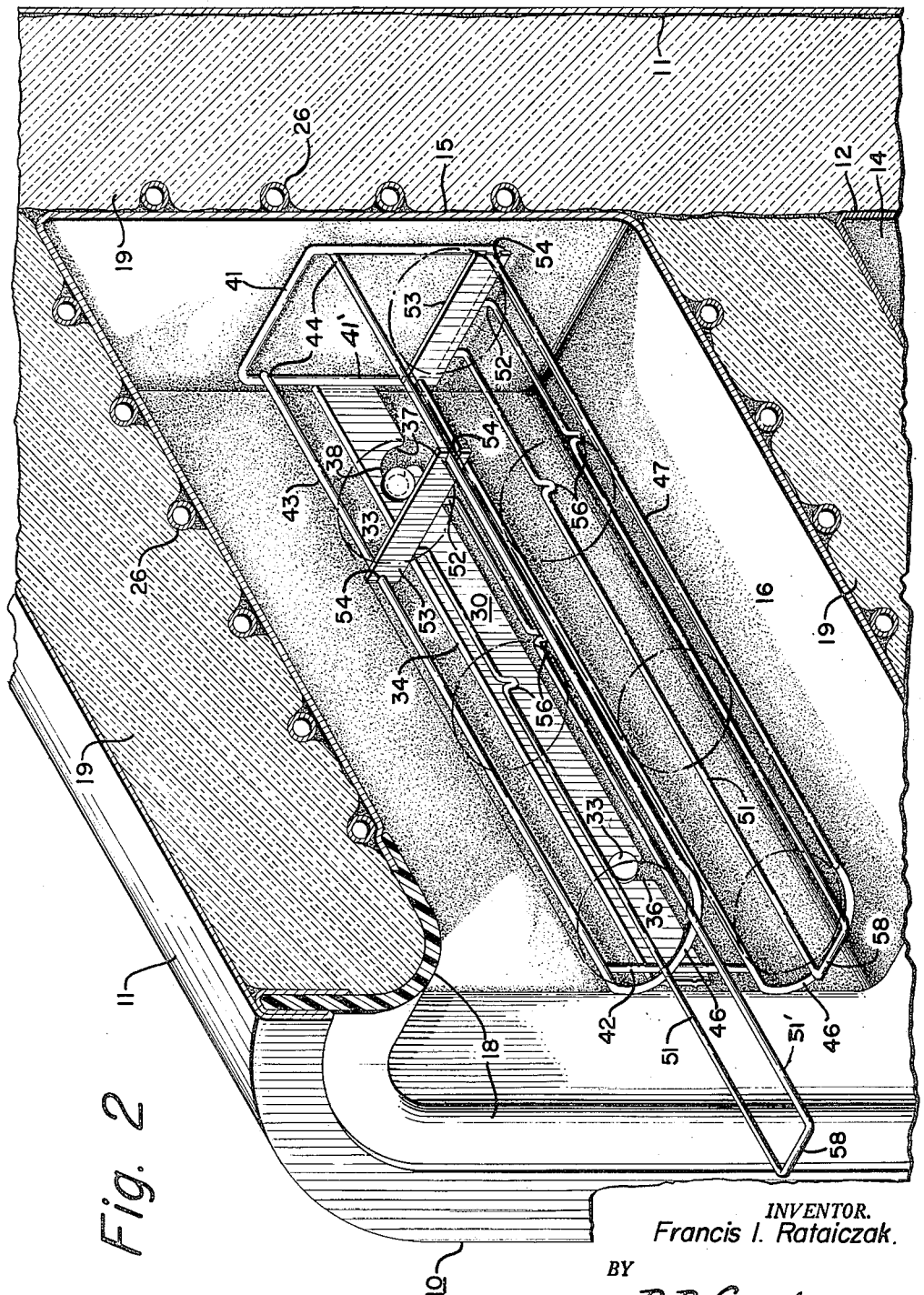
Figure 2 is an enlarged fragmentary substantially perspective sectional view through the frozen food compartment of the cabinet shown in Figure 1 and taken on the line 2—2 thereof.

Figure 3 is an enlarged fragmentary vertical sectional view taken on the line 3—3 of Figure 1 showing one side of a can supporting and dispensing device mounted in the frozen food compartment of the refrigerator cabinet; and Figure 4 is an enlarged fragmentary horizontal sectional view taken on the line 4—4 of Figure 3 and shows one of the studs for securing the device to a wall of the frozen food compartment of the refrigerator cabinet.

Referring now to the drawings I show in Figure 1 thereof a household or domestic refrigerator cabinet generally represented by the reference character 10. Cabinet 10 is of usual or conventional construction and includes an outer metal shell or panels 11, a lower metal liner 12, forming a main or unfrozen food storage compartment 14 in the cabinet, and an upper metal liner 15 forming walls of a freezing or frozen food storage compartment 16 in cabinet 10 (see Figure 2). The liners 12 and 15 each have a forwardly facing opening and a rigid nonmetallic insulating breaker strip 18 is mounted on cabinet 10 and spans the space between the front edge of the liners and the cabinet outer shell. Both liners 12 and 15 are spaced from the outer walls of cabinet 10 and any suitable or desirable and preferably packaged or wrapped insulating material 19 is disposed in this space and in the space between the two liners. The open front of upper frozen food compartment 16 is closed by an insulated door 21 and the front of the unfrozen food compartment 14 is closed by an insulated door 22 (see Figure 1). A closed refrigerating system associated with cabinet 10 may include a motor-compressor-condenser unit, located in a machine compartment below food compartment 14, and suitable refrigerant evaporators for cooling the interior of compartments 14 and 16. The evaporator of the refrigerating system employed to cool the interior of frozen food compartment 16 below 32° F. is in the form of a refrigerant evaporating conduit 26 wrapped or coiled around liner 15 and secured in intimate thermal contact therewith. Any suitable or conventional control may be utilized for controlling operations of the motor-compressor-condenser unit of the refrigerating system to maintain proper temperatures in the compartments 14 and 16. The freezing or frozen food storage compartment 16 is provided at one side thereof with supports or ledges for receiving trays 28 adapted to contain water to be frozen as is conventional in the type of refrigerator herein disclosed.

In accordance with the aforesaid objects I provide a pair of horizontally spaced apart round studs 31 which are riveted to one upright side wall of liner 15. These studs 31 each have a projecting shank portion 32 and an enlarged head 33 (see Figure 4). A horizontally elongated device, generally represented by the reference character 30 in Figure 1 of the drawings, includes a framework or rack mounted within the frozen food storage compartment 16 and supported therein by shank portion 32 of studs 31. Device 30 extends from the front of compartment 16 toward and adjacent the rear wall thereof and forms a relatively narrow structure, with respect to the width of compartment 16, to provide a means for receiving and supporting cans of frozen juice or the like as will be presently described. The framework or rack of device 30 includes a flat metal strap portion 34 provided near the front thereof with a vertical slot 36 and provided near the rear thereof with a slot having a vertical portion 37 and a horizontal portion 38 (see Figures 3 and 4). The width of these slots substantially corresponds to the diameter of the shank part 32 of studs 31 and are adapted to fit snugly thereover and to be held thereon by the enlarged head 33 of the studs 31 (see Figure 4). The framework or rack of device 30 also includes a rectangular shaped vertically disposed wire loop 41, having its one upright side 41' welded to the rear part of metal strip 34, and a straight piece of wire 42 welded to the front part of strap 34. A hairpin-like or U-shaped wire 43 has the ends 44 of its leg portions welded to the inner part of opposed upright sides of wire loop 41 near the top thereof and has its base or the bight portion 46 of the U bent down from the leg portions thereof (see Figure 3). The front portion of one leg of the U-shaped wire 43 is welded to the upper part of wire 42 at the front of device 30. Another hairpin-like or U-shaped wire 47 has portions similar to the portions or wire 43 secured to the wires 41 and 42 below wire 43. This lower U-shaped wire 47 is vertically spaced from the U-shaped wire 43 as best shown in Figure 3 of the drawings. Each wire 43 and 47 of the rack device 30 forms horizontally spaced apart guides and has a slide movably associated therewith. Each of the slides of the rack device 30 comprises a horizontally disposed hairpin-like or U-shaped wire 51 with the ends of the legs of the U bent upwardly as at 52 and welded to a flat metal piece 53. The metal piece 53 of each slide has notches 54 struck or cut from the sides thereof and these notches receive and fit over or straddle the leg or guide portions of the U-shaped wires 43 and 47, to support the rear part of the slides 51, to lock the slides thereto and to prevent detachment of the slides from the framework or rack of device 30. The leg portions 51' of each U-shaped wire slide 51 are provided with downwardly extended and reversely bent portions 56 which portions form a stop for limiting movement of the slides relative to and outwardly of the U-shaped wires 43 and 47 of device 30 for a purpose to be hereinafter explained. It will be noted that the slides or U-shaped wires 51 are substantially coextensive with the U-shaped wires 43 and 47 of device 30 and that the front part of wires 51 adjacent the bight portion 58 thereof rest on and are supported by the downwardly bent bight portion 46 of wires 43 and 47. The bight portion 58 of slide wires 51 serves as a handle therefor and is straight and lies in a horizontal plane to also form a stop for limiting movement of the cans placed on the slides forwardly thereof. By supporting the slide wires 51 at the front and rear thereof from the U-shaped wires 43 and 47 of the framework or rack of device 30 the legs or leg portions of the wire slides 51 form the sole support for cans to be placed thereon.

In order to anchor the device 30 within compartment 16 the front end of the device is elevated above the front stud 31 and the vertical portion 37 of the slot in the rear part of metal strap 34 is located over the head 33 on the rear stud 31 to permit lowering of the rear end of the device relative to this rear stud and the device 30 is then pushed rearwardly in compartment 16 to cause the horizontal part 38 of the rear slot to engage the shank portion 32 of rear stud 31. When the end of part 38 of the rear slot strikes the rear stud 31 the front slot 36 in strap 34 is aligned with the forwardmost stud 31 and the front portion of device 30 is then lowered to cause the end of slot 36 to engage and straddle this stud. It will be noted that after pushing the device 30 as described it is thereby stationarily locked in place in compartment 16 against movement in all directions except that its front end may be elevated to permit removal of the device from the compartment by reversing the movements thereof employed to mount the same in compartment 16.

A plurality of cans of frozen juice or the like, as shown by the dot-dash lines in Figures 2 and 3 of the drawings, are placed on the U-shaped wire slides 51 of device 30. Preferably each slide 51 receives three or more cans to form a row thereof on the slide disposed in end to end relationship. The leg portions of the U-shaped wire slides 51 are engaged by the cans and the cans are free of engagement with the rack or framework of device 30 whereby the leg portions of wire slides 51 form the sole support for cans in or on the device. The rearmost can of a row thereof on a slide 51 engages the metal piece 53 to prevent same from sliding rearwardly off the slide. The forwardmost can of a row of cans on a slide 51 engages the straight horizontally disposed bight portion 58 of the U-shaped wire slides 51 to limit movement of the forward can relative to a slide and to prevent it from accidental slipping off the slide. Each U-shaped wire slide 51 is movable relative to the framework or rack of device 30 outwardly of cabinet 10 beyond the access open front of the freezing or frozen food storage compartment 16. For example, door 21 is shown, in Figure 2 of the drawings, as having been opened and the lower U-shaped wire slide 51 is shown in its normal can supporting position within device 30. In this same figure of the drawings I show the upper U-shaped wire slide 51 as being slid outwardly of device 30, and consequently cabinet 10, through the front opening of compartment 16 into a position at the front of compartment 16 beyond its access opening. The front dispensing end of this upper slide 51 is in the clear and the forwardmost can of frozen juice thereon can be readily grasped and removed from the slide without interference from other portions of the refrigerator cabinet. It will be noted that the rear metal piece 53 has been moved along the framework of device 30 and that the leg portions of the U-shaped wire part 43 of the device has guided the sliding movement of this upper slide 51. The upper slide may if desired be slid further outwardly of compartment 16 to provide access to other cans thereon. In Figure 3 of the drawings the lower slide 51 of device 30 is shown slid outwardly of the framework thereof into a position whereby the stops 56 on this slide engage the front bight portion 46 of the lower U-shaped wire 47 of the device. The forward cans of juice have been removed from this lower slide and a portion of the rearmost can thereon has been moved outwardly of compartment 16 to locate this portion of the rearmost can beyond the front of device 30 whereby it is readily accessible without interference for removal from the refrigerator. The major portion of the rearmost can on this lower slide is retained within the device 30 by stops 56 limiting outward movement of the slide. In this same figure of the drawings I show the uppermost of the slides 51 in its normal or home position within device 30 and compartment 16. The purpose of locating the stops 56 at the point shown is twofold. The stops 56 expose a sufficient portion of the rearmost can of a row of cans on a slide to permit its accessibility and removal. By stopping the forward sliding movement of the slides 51 prior to permitting the rear end thereof or metal piece 53 thereon to reach the front of device 30 the structural strength of the slides is increased and I reduce to a minimum the bowing down of the slides 51 under the effect of weight of the cans at the front of the refrigerator cabinet when a filled or loaded slide is moved forwardly of the framework of the device. In this manner I prevent the slides from being sprung out of a horizontal plane and prevent the same from taking a permanent bow.

It should be apparent from the foregoing that I have provided an improved arrangement for storing and segregating cans of frozen juice and the like from all other food products normally positioned in the freezing or food storage compartment of a refrigerator cabinet. My improved arrangement eliminates the necessity of shifting frozen packaged foods about within a frozen food compartment of a refrigerator and eliminates the hazard of dropping such loosened packaged foods out of the compartment and onto a person seeking to remove a can of frozen juice therefrom. My rack-like device by virtue of being substantially wholly constructed of round wire material is of low cost and can be provided in a refrigerator without materially increasing the selling price thereof. The present device in addition to storing cans of frozen juice or the like in an isolated manner in a freezing compartment of a refrigerator also renders these cans readily accessible for removal from the compartment without interference by other parts of the refrigerator cabinet and without interference by other food products in the compartment. The can receiving slides in my improved device bear against their supports on the framework or rack portion thereof only at four points and the cans engage only the slides to thus permit the slides to be moved with the greatest of ease.

While the form of embodiment of the invention as herein disclosed constitutes a preferred form, it is to be understood that other forms might be adopted, as may come within the scope of the claim which follows.

What is claimed is as follows:

A rack device for use in a refrigerator cabinet food storage compartment having at least three upright walls and a front opening, said rack device being narrow as compared to the width of said compartment and disposed along one of said upright side walls thereof unsupported from said other walls, said rack device comprising a unitary framework including a vertically elongated rear portion, spaced upper and lower horizontal U-shaped wire portions having the end of the legs thereof secured to said rear portion and extending forwardly thereof to provide vertically spaced apart sets of guides, a connector on one side of the forward portion of said guides to maintain said sets thereof in vertically spaced relation and a mounting strap extending between said connector and said vertically elongated rear portion adapted to be attached to said one compartment wall for stationarily securing said framework in said compartment, said rack device also comprising separate and independent slides on each of said sets of guides, each slide being adapted to receive and support a row of cans of juice or the like in end to end relationship thereon, each of said slides being in the form of a flat U-shaped horizontally disposed single wire located between the legs of a guide, the legs of each of said flat U-shaped slides being longer than said U-shaped guides with the forward portion of a slide overlapping and resting upon the bight portion of its respective guide, means slidably supporting the ends of the legs of said U-shaped slides on the legs of said guides, and the flat bight portion of each of said U-shaped wire slides serving as a stop to prevent shifting of a can off same when a slide is moved relative to the framework of said rack device.

References Cited in the file of this patent
UNITED STATES PATENTS

| | | |
|---|---|---|
| 985,924 | Nelson | Mar. 7, 1911 |
| 1,910,046 | Pascoe | May 23, 1933 |
| 1,946,532 | Hatch | Feb. 13, 1934 |
| 1,974,983 | Cook | Sept. 25, 1934 |
| 2,005,939 | Hibbard | June 25, 1935 |
| 2,018,002 | Avery | Oct. 22, 1935 |
| 2,029,109 | Kucher | Jan. 28, 1936 |
| 2,033,792 | Sywert et al. | Mar. 10, 1936 |
| 2,287,611 | Harbison | June 23, 1942 |